(12) United States Patent
Belov

(10) Patent No.: US 7,155,464 B2
(45) Date of Patent: Dec. 26, 2006

(54) RECOVERING AND CHECKING LARGE FILE SYSTEMS IN AN OBJECT-BASED DATA STORAGE SYSTEM

(75) Inventor: Daniel Belov, Pittsburgh, PA (US)

(73) Assignee: Panasas, Inc., Pittsburgh, PA (US)

(*) Notice: Subject to any disclaimer, the term of this patent is extended or adjusted under 35 U.S.C. 154(b) by 465 days.

(21) Appl. No.: 10/349,369

(22) Filed: Jan. 22, 2003

(65) Prior Publication Data

US 2003/0187859 A1    Oct. 2, 2003

Related U.S. Application Data

(60) Provisional application No. 60/368,785, filed on Mar. 29, 2002.

(51) Int. Cl.
*G06F 17/30* (2006.01)

(52) U.S. Cl. .................. 707/204; 707/205; 711/165

(58) Field of Classification Search ........ 707/200–206; 714/21
See application file for complete search history.

(56) References Cited

U.S. PATENT DOCUMENTS

| | | | | |
|---|---|---|---|---|
| 5,890,169 A * | 3/1999 | Wong et al. | ................. | 707/206 |
| 5,898,868 A * | 4/1999 | Krueger et al. | ............. | 707/205 |
| 6,032,227 A * | 2/2000 | Shaheen et al. | ............ | 711/129 |
| 6,584,582 B1 * | 6/2003 | O'Connor | ..................... | 714/21 |
| 6,732,124 B1 * | 5/2004 | Koseki et al. | .............. | 707/202 |
| 6,850,969 B1 * | 2/2005 | Ladan-Mozes et al. | ..... | 709/213 |
| 2003/0115227 A1 * | 6/2003 | Guthery | ...................... | 707/205 |

* cited by examiner

*Primary Examiner*—Debbie M. Le
(74) *Attorney, Agent, or Firm*—Morgan, Lewis & Bockius LLP

(57) ABSTRACT

In a file system recovery (FSRC) process, an FSRC module performs dynamic checks on file system objects to verify parent-child relationships among various objects in the system. The FSRC module stores a list of objects in the system and relevant object-related information for each object in a memory. A dynamic check on each listed object is then performed using the object-related information to verify parent-child relationships for that object. After the dynamic check is over, the object is removed from the list and its object-related information is deleted from the memory.

15 Claims, 6 Drawing Sheets

RECOVERING AND CHECKING LARGE FILE SYSTEMS IN AN OBJECT-BASED DATA STORAGE SYSTEM

REFERENCE TO RELATED APPLICATIONS

This application is related to prior filed co-pending, commonly-owned U.S. provisional patent application Ser. No. 60/368,785, filed on Mar. 29, 2002, the disclosure of which is incorporated herein by reference in its entirety.

BACKGROUND

1. Field of the Invention

The present invention generally relates to data storage systems and methods, and, more particularly, to a method for checking and recovering large file systems in a distributed object-based data storage system.

2. Description of Related Art

As part of checking a file system in a data storage environment, the information identifying all the files and directories in the file system is generally stored in a memory and then a file system recovery (FSRC) process is performed using the information stored in the memory to verify that the existing data structure is good or error-free and that all the files in the system are in those directories where they are supposed to be. Thus, the FSRC process performs a file system integrity check and also executes steps necessary to recover faulty or missing directory entries to maintain a healthy and correct file system.

In an object-based data storage system, often the memory consumption for efficient file system recovery process is a linear function of the number of objects (file objects as well as directory objects) in the file system. In other words, in case of a large number of objects, a large memory is needed to store all file and directory object-related information for FSRC process. With millions or billions of objects in modern distributed data storage systems, the memory space requirement for FSRC-related information storage may be prohibitive. Further, because of the presence of a very large number of objects in modern data storage systems, traditional file system recovery process may become very time consuming because of the need to check all objects.

When the FSRC process is executed, it is typically the only process that accesses data on storage. There may be orphan objects or missing directory entries that require that the FSRC process walk through and check all the objects in the system to cure or rectify the missing information. An FSRC process may typically perform two types of file system checks: static and dynamic. A static check can be done without looking at the parents or children of an object and can be performed transparently anytime an object is cached or stored in the system. In a static check on an object, the object needs to be "touched" only once. The verb "touch" as used in various forms hereinbelow refers to the act of accessing an object that is stored in a main system memory or cached in the system or stored on a storage disk to get (or set) the object's attributes (e.g., in case of a file object) or to read or write object entries (e.g., in case of a directory object).

In the discussion below, the term "parent-child relationship" between two or more objects refers to a forward pointer (e.g., a directory entry) from a parent object to its child object and a backward pointer (e.g., an object attribute) from a child object to its parent object. It is noted that the term "parent-child relationship" also includes a child-parent relationship. Thus, the term "parent-child relationship" does not strictly imply that the first object is always a parent and the second one is always a child. A dynamic check makes sure that for every forward pointer there exists a backward pointer. Thus, dynamic checks, as opposed to static checks, make sure that all parent-child relationships among the system objects are correct. Hence, dynamic checks may require to touch multiple objects in the system to verify existence of proper parent-child relationships among related objects. For example, during a dynamic check, the FSRC process may go through a list of objects in order and may first come to a parent P that has children A, B, and C. Later, during the file system checking, the FSRC process may come to the child C in the list and, at that time, the FSRC process must touch the parent P again to make sure that P has a forward pointer to C because it may happen that instead of C there may be another child object D that has a backward pointer to P, but P has no forward pointer to D. The roles of parents and children is reversed when a child is encountered first in the list. In that case, the FSRC process may need to touch the parent object as many times as there are children of that parent that point to the parent but are in front of the parent in the list of objects.

As noted before, the presence of extremely large number of objects in advanced data storage systems mandates a very large amount of memory (on the order of many gigabytes) if object-related information for all objects is to be stored at the time of dynamic checking. This may not be possible when system storage space is limited and has to be apportioned among a number of applications. Further, a dynamic checking may require touching of multiple objects from random places in the list of objects. Thus, when an FSRC process is performed with a limited amount of memory space, the necessity to touch multiple objects from random places may require time-consuming I/O operations, thereby degrading the system performance during file system checking and recovery.

Therefore, it is desirable to devise a method to efficiently check a file system that has a very large number of objects. As multiple pass- or touch-oriented traditional dynamic file system checks are time-consuming and heavily I/O dependent, it is desirable to have an FSRC process that performs dynamic checks on system objects by touching an object only once. It is further desirable that the FSRC process perform efficient file system checking and recovery without requiring a memory space that is a linear function of the number of objects in the system.

SUMMARY

In one embodiment, the present invention contemplates a method of performing file system recovery in an object-based data storage system. The method comprises storing a list of objects that are stored in the data storage system in a memory in the data storage system; performing a dynamic check on each object in the list as part of the file system recovery, wherein the dynamic check includes verification of all parent-child relationships between two or more objects contained in the list; and removing from the list in the memory each such object whose corresponding dynamic check has been completed.

In another embodiment, the present invention further contemplates a method of performing file system recovery in an object-based data storage system. The method comprises dividing all objects stored in the data storage system among a plurality of segments with each of the plurality of segments containing a non-overlapping portion of the stored objects; storing an object list containing a list of all objects in a first segment in the plurality of segments in a memory in the data storage system; performing a dynamic check on each object in the object list as part of the file system recovery, wherein the dynamic check includes verification of all parent-child relationships between two or more objects contained in the first segment and also between a first object in the first segment and a second object in a second segment in the plurality of segments; removing from the object list in the memory each such object whose corresponding dynamic check has been completed; listing a corresponding different object from a third segment in the plurality of segments in place of each object removed from the object list; and further performing the dynamic check on each object from the third segment that is listed in the object list.

In a further embodiment, the present invention contemplates a method of performing file system recovery in an object-based data storage system. The method comprises dividing all objects stored in the data storage system among a plurality of segments with each of the plurality of segments containing a non-overlapping portion of the stored objects; establishing a plurality of link databases, wherein each link database in the plurality of link databases corresponds to a different one of the plurality of segments; performing a dynamic check on each object in a first segment in the plurality of segments as part of the file system recovery, wherein the first dynamic check includes verification of all parent-child relationships between two or more objects contained in the first segment and also between one object in the first segment and another object in a second segment in the plurality of segments; identifying one or more linked objects in the first segment, wherein each linked object in the first segment has a parent-child relationship with one or more other objects in one or more other segments in the plurality of segments; and populating a link database corresponding to the second segment with a respective entry for each linked object in the first segment that has a corresponding destination object in the second segment, wherein each destination object in the second segment has the parent-child relationship with a respective linked object in the first segment, and wherein each entry in the link database contains information describing how each destination object in the second segment is linked to the respective linked object in the first segment via a forward or a backward link.

A link database for segment X keeps links (forward or backward pointers) from segments Y (Y≠X) such that the destination object of each link is in segment X. During dynamic checking of objects in segment X, the link database for segment X is also loaded in the memory allotted for the file system recovery process and is consulted to verify parent-child relationships between an object in segment X that is linked to another object in another segment. Thus, with a link database for a segment, multiple passes to objects in the system are avoided during file system recovery. A file system recovery (FSRC) module according to the present invention efficiently checks a file system that has a very large number of objects. The FSRC module performs dynamic checks on system objects by touching an object only once. Further, the FSRC module performs efficient file system checking and recovery without requiring a memory space that is a linear function of the number of objects in the system.

BRIEF DESCRIPTION OF THE DRAWINGS

The accompanying drawings, which are included to provide a further understanding of the invention and are incorporated in and constitute a part of this specification, illustrate embodiments of the invention that together with the description serve to explain the principles of the invention. In the drawings.

DETAILED DESCRIPTION

Reference will now be made in detail to the preferred embodiments of the present invention, examples of which are illustrated in the accompanying drawings. It is to be understood that the figures and descriptions of the present invention included herein illustrate and describe elements that are of particular relevance to the present invention, while eliminating, for purposes of clarity, other elements found in typical data storage systems or networks.

It is worthy to note that any reference in the specification to "one embodiment" or "an embodiment" means that a particular feature, structure or characteristic described in connection with the embodiment is included in at least one embodiment of the invention. The appearances of the phrase "in one embodiment" at various places in the specification do not necessarily all refer to the same embodiment.

Figure 1:
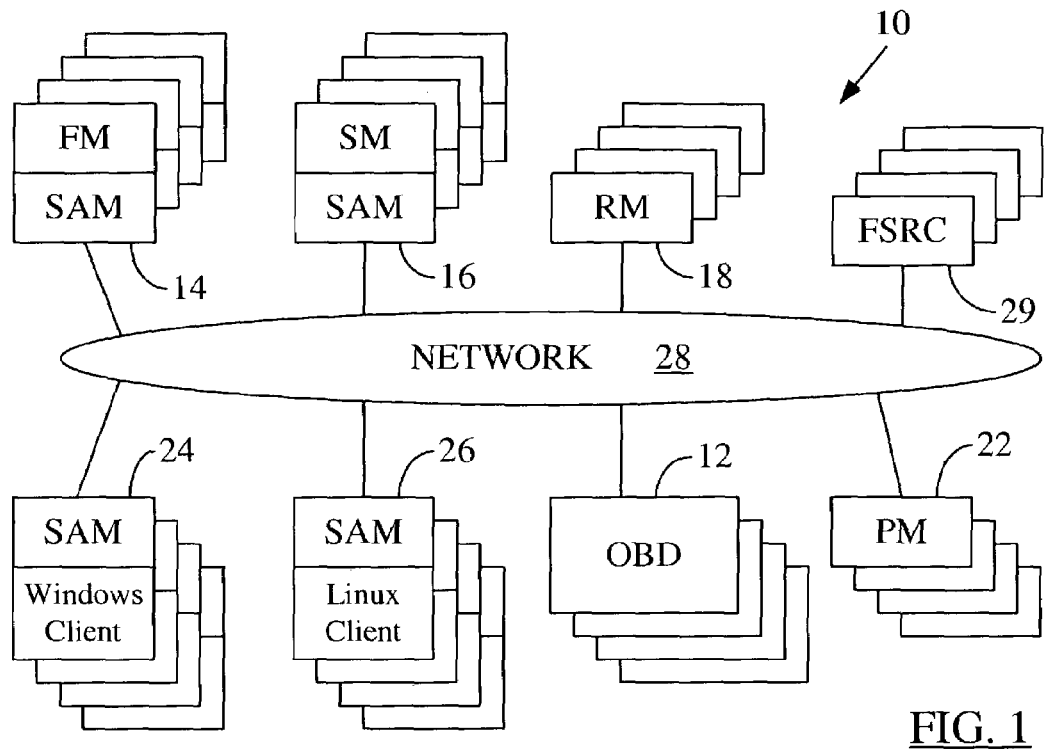
FIG. 1 illustrates an exemplary network-based file storage system designed around Object Based Secure Disks (OBSDs or OBDs)

FIG. 1 illustrates an exemplary network-based file storage system 10 designed around Object Based Secure Disks (OBSDs or OBDs) 12. The file storage system 10 is implemented via a combination of hardware and software units and generally consists of managers 14, 16, 18, and 22, OBDs 12, clients 24, 26, and a file system recovery (FSRC) module 29. It is noted that FIG. 1 illustrates multiple clients, OBDs, managers, and FSRC modules—i.e., the network entities—operating in the network environment. However, for the ease of discussion, a single reference numeral is used to refer to such entity either individually or collectively depending on the context of reference. For example, the reference numeral "12" is used to refer to just one OBD or a group of OBDs depending on the context of discussion. Similarly, the reference numerals 14–22 and 29 for various managers and FSRC modules respectively are used interchangeably to also refer to respective servers for those managers or FSRC modules. For example, the reference numeral "14" is used to interchangeably refer to the software file managers (FM) and also to their respective servers depending on the context. Similarly, the numeral "29" identifies the FSRC software and also a respective FSRC server depending on the context.

It is noted that each manager or the FSRC module is an application program code or software running on a corresponding server. The server functionality may be implemented with a combination of hardware and operating software. For example, each server in FIG. 1 may be a Windows NT® server. Thus, the file system 10 in FIG. 1 is an object-based distributed data storage system implemented in a client-server configuration.

The network 28 may be a LAN (Local Area Network), WAN (Wide Area Network), MAN (Metropolitan Area Network), SAN (Storage Area Network), wireless LAN, or any other suitable data communication network including a TCP/IP (Transmission Control Protocol/Internet Protocol) based network (e.g., the Internet). A client 24, 26 may be any computer (e.g., a personal computer or a workstation) electrically attached to the network 28 and running appropriate operating system software as well as client application software designed for the system 10. FIG. 1 illustrates a group of clients or client computers 24 running on Microsoft Windows® operating system, whereas another group of clients 26 are running on the Linux® operating system. The clients 24, 26 thus present an operating system-integrated file system interface. The semantics of the host operating system (e.g., Windows®, Linux®, etc.) may preferably be maintained by the file system clients.

The manager (or server), FSRC module and client portions of the program code may be written in C, C++, or in any other compiled or interpreted language suitably selected. The client, FSRC and manager software modules may be designed using standard software tools including, for example, compilers, linkers, assemblers, loaders, bug tracking systems, memory debugging systems, etc.

In one embodiment, the manager software and program codes running on the clients may be designed without knowledge of a specific network topology. In that case, the software routines may be executed in any given network environment, imparting software portability and flexibility in storage system designs. However, it is noted that a given network topology may be considered to optimize the performance of the software applications running on it. This may be achieved without necessarily designing the software exclusively tailored to a particular network configuration.

FIG. 1 shows a number of OBDs 12 attached to the network 28. An OBSD or OBD 12 is a physical disk drive that stores data files in the network-based system 10 and may have the following properties: (1) it presents an object-oriented interface rather than a sector-based interface (wherein each "block" on a disk contains a number of data "sectors") as is available with traditional magnetic or optical data storage disks (e.g., a typical computer hard drive); (2) it attaches to a network (e.g., the network 28) rather than to a data bus or a backplane (i.e., the OBDs 12 may be considered as first-class network citizens); and (3) it enforces a security model to prevent unauthorized access to data stored thereon.

The fundamental abstraction exported by an OBD 12 is that of an "object," which may be defined as a variably-sized ordered collection of bits. Contrary to the prior art block-based storage disks, OBDs do not export a sector interface (which guides the storage disk head to read or write a particular sector on the disk) at all during normal operation. Objects on an OBD can be created, removed, written, read, appended to, etc. OBDs do not make any information about particular disk geometry visible, and implement all layout optimizations internally, utilizing lower-level information than can be provided through an OBD's direct interface with the network 28. In one embodiment, each data file and each file directory in the file system 10 are stored using one or more OBD objects.

In a traditional networked storage system, a data storage device, such as a hard disk, is associated with a particular server or a particular server having a particular backup server. Thus, access to the data storage device is available only through the server associated with that data storage device. A client processor desiring access to the data storage device would, therefore, access the associated server through the network and the server would access the data storage device as requested by the client.

On the other hand, in the system 10 illustrated in FIG. 1, each OBD 12 communicates directly with clients 24, 26 on the network 28, possibly through routers and/or bridges (not shown). The OBDs, clients, managers, etc., may be considered as "nodes" on the network 28. In system 10, no assumption needs to be made about the network topology (as noted hereinbefore) except that each node should be able to contact every other node in the system. The servers (e.g., servers 14, 16, 18, etc.) in the network 28 merely enable and facilitate data transfers between clients and OBDs, but the servers do not normally implement such transfers.

In one embodiment, the OBDs 12 themselves support a security model that allows for privacy (i.e., assurance that data cannot be eavesdropped while in flight between a client and an OBD), authenticity (i.e., assurance of the identity of the sender of a command), and integrity (i.e., assurance that in-flight data cannot be tampered with). This security model may be capability-based. A manager grants a client the right to access the data storage (in one or more OBDs) by issuing to it a "capability." Thus, a capability is a token that can be granted to a client by a manager and then presented to an OBD to authorize service. Clients may not create their own capabilities (this can be assured by using known cryptographic techniques), but rather receive them from managers and pass them along to the OBDs.

A capability is simply a description of allowed operations. A capability may be a set of bits (1's and 0's) placed in a predetermined order. The bit configuration for a capability may specify the operations for which that capability is valid. Thus, there may be a "read capability," a "write capability," a "set-attribute capability," etc. Every command sent to an OBD may need to be accompanied by a valid capability of the appropriate type. A manager may produce a capability and then digitally sign it using a cryptographic key that is known to both the manager and the appropriate OBD, but unknown to the client. The client will submit the capability with its command to the OBD, which can then verify the signature using its copy of the key, and thereby confirm that the capability came from an authorized manager (one who knows the key) and that it has not been tampered with in flight. An OBD may itself use cryptographic techniques to confirm the validity of a capability and reject all commands that fail security checks. Thus, capabilities may be cryptographically "sealed" using "keys" known only to one or more of the managers 14–22 and the OBDs 12.

Logically speaking, various system "agents" (i.e., the clients 24, 26, the managers 14–22, the FSRC module 29 and the OBDs 12) are independently-operating network entities. Day-to-day services related to individual files and directories are provided by file managers (FM) 14. The file manager 14 is responsible for all file- and directory-specific states. The file manager 14 creates, deletes and sets attributes on entities (i.e., files or directories) on clients' behalf. When clients want to access other entities on the network 28, the file manager performs the semantic portion of the security work—i.e., authenticating the requester and authorizing the access—and issuing capabilities to the clients. File managers 14 may be configured singly (i.e., having a single point of failure) or in failover configurations (e.g., machine B tracking machine A's state and if machine A fails, then taking over the administration of machine A's responsibilities until machine A is restored to service).

The primary responsibility of a storage manager (SM) 16 is the aggregation of OBDs for performance and fault tolerance. A system administrator (e.g., a human operator or software) may choose any layout or aggregation scheme for a particular object. The SM 16 may also serve capabilities allowing clients to perform their own I/O to aggregate objects (which allows a direct flow of data between an OBD and a client). The storage manager 16 may also determine exactly how each object will be laid out—i.e., on what OBD or OBDs that object will be stored, whether the object will be mirrored, striped, parity-protected, etc. This distinguishes a "virtual object" from a "physical object". One virtual object (e.g., a file or a directory object) may be spanned over, for example, three physical objects (i.e., OBDs).

The storage access module (SAM) is a program code module that may be compiled into the managers as well as the clients. The SAM generates and sequences the OBD-level operations necessary to implement system-level I/O operations, for both simple and aggregate objects.

The installation of the manager and client software to interact with OBDs 12 and perform object-based data storage in the file system 10 may be called a "realm." The realm may vary in size, and the managers and client software may be designed to scale to the desired installation size (large or small). A realm manager 18 is responsible for all realm-global states. That is, all states that are global to a realm state are tracked by realm managers 18. A realm manager 18 maintains global parameters, notions of what other managers are operating or have failed, and provides support for up/down state transitions for other managers. Realm managers 18 keep such information as realm-wide file system configuration, and the identity of the file manager 14 responsible for the root of the realm's file namespace. A state kept by a realm manager may be replicated across all realm managers in the system 10, and may be retrieved by querying any one of those realm managers 18 at any time.

A performance manager 22 may run on a server that is separate from the servers for other managers (as shown, for example, in FIG. 1) and may be responsible for monitoring the performance of the file system realm and for tuning the locations of objects in the system to improve performance. The program codes for managers typically communicate with one another via RPC (Remote Procedure Call) even if all the managers reside on the same node (as, for example, in the configuration in FIG. 2).

A further discussion of various managers shown in FIG. 1 (and FIG. 2) and the interaction among them is provided on pages 11–15 in the co-pending, commonly-owned U.S. patent application Ser. No. 10/109,998, filed on Mar. 29, 2002, titled "Data File Migration from a Mirrored RAID to a Non-Mirrored XOR-Based RAID Without Rewriting the Data", whose disclosure at pages 11–15 is incorporated by reference herein in its entirety.

In one embodiment, the FSRC module 29 is a program code that operates in the network 28 as a network entity (in a manner similar to, for example, a manager software) and performs system-wide file system checking and recovery when executed. The FSRC module 29 may be self-executing (e.g., at a predetermined time during the day) or, alternatively, may be executed by an external command (e.g., from a human operator or a software system administrator). In one embodiment, when the FSRC module 29 accesses data on storage, all client and manager accesses to OBDs 12 may be prevented (e.g., by disabling capabilities) while the FSRC module 29 is running. A more detailed discussion of various operations performed by the FSRC module 29 is given hereinbelow with reference to FIGS. 5–9.

Figure 2:
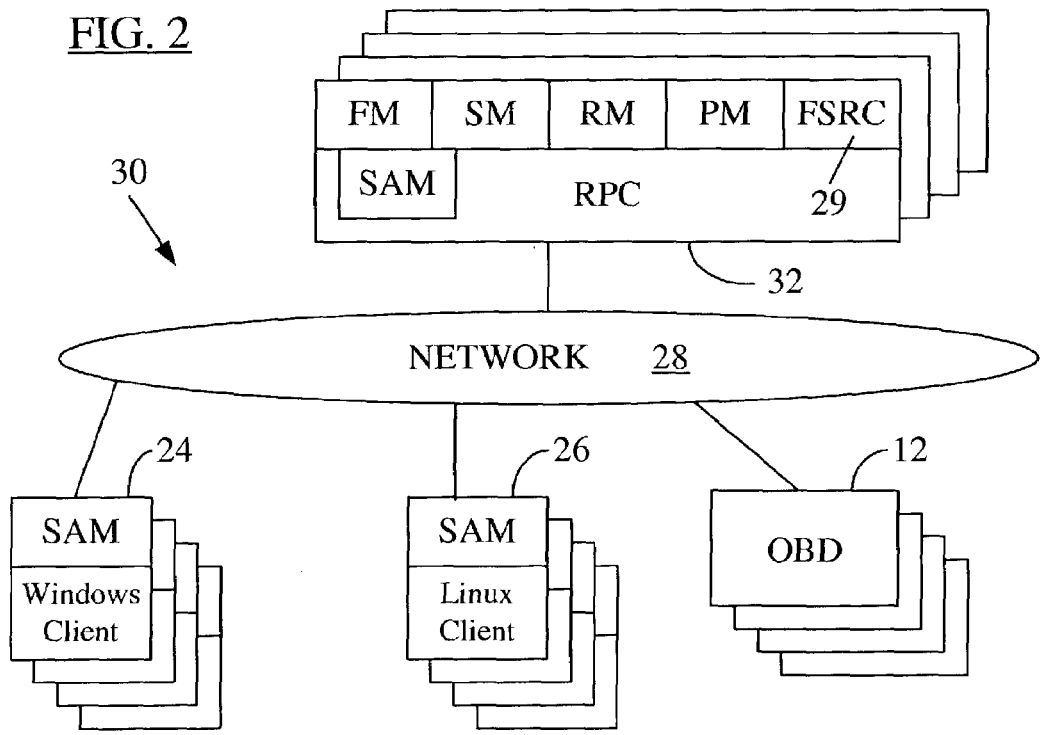
FIG. 2 illustrates an implementation where various managers shown individually in FIG. 1 are combined in a single binary file.

FIG. 2 illustrates one implementation 30 where various managers and FSRC modules shown individually in FIG. 1 are combined in a single binary file 32. FIG. 2 also shows the combined file available on a number of servers 32. In the embodiment shown in FIG. 2, various managers and FSRC modules shown individually in FIG. 1 are replaced by a single manager software or executable file that can perform all the functions of each individual file manager, storage manager, FSRC module, etc. It is noted that all the discussion given hereinabove and later hereinbelow with reference to the file storage system 10 in FIG. 1 equally applies to the file storage system embodiment 30 illustrated in FIG. 2. Therefore, additional reference to the configuration in FIG. 2 is omitted throughout the discussion, unless necessary.

Figures 3, 4, 5:
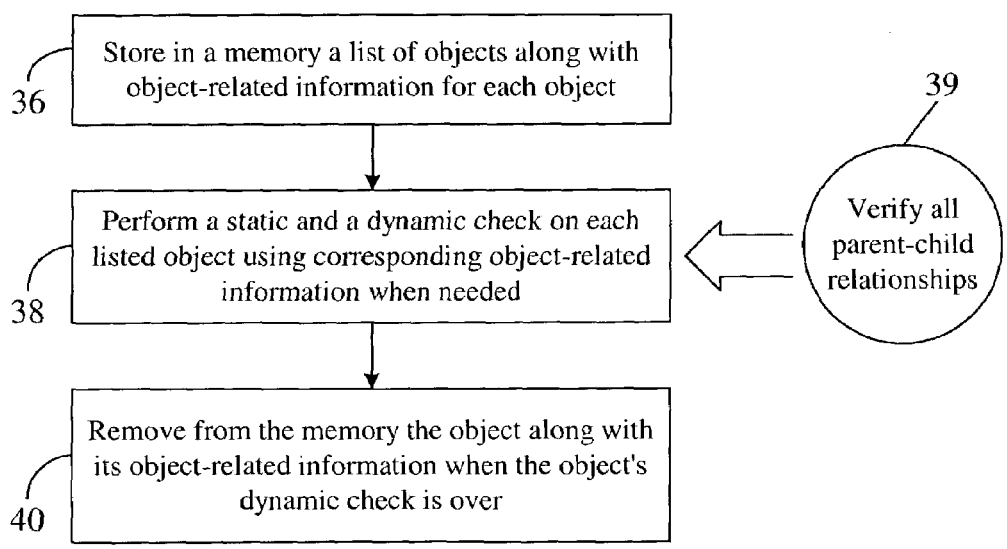
FIG. 3 shows a three-level storage configuration for objects stored in the object-based data storage system in FIG. 1.
FIG. 4 is an exemplary representation of how objects are organized in a file directory in the data storage system in FIG. 1.
FIG. 5 is an exemplary flowchart depicting steps involved in performing file system checking and recovery according to one embodiment of the present invention.

In the system 10 in FIG. 1, the storage configuration may be organized in three levels as illustrated in FIG. 3. Each higher level may be considered as a "container" for the next lower one. Thus, a device (e.g., a storage manager 16 or an OBD 12) may contain one or more object groups, with each object group containing one or more objects, as illustrated in FIG. 3. However, it is noted that some devices may not contain any object group. Every object stored on an OBD may have an associated set of attributes. Some of the major attributes for an object include: (1) a device_ID identifying, for example, the OBD storing that object and the file and storage managers managing that object; (2) an object-group_ID identifying the object group containing the object in question; and (3) an object_ID containing a number randomly generated (e.g., by a storage manager) to identify the object in question. For example, the values for the {device_ID, object-group_ID, object_ID} triplet for an object may be {SM #3, object-group #29, object #6003}. It is noted that, in one embodiment, each {device_ID, object-group_ID, object_ID} triplet must be unique in the realm. In other words, even if two objects have the same object_ID, they cannot have the same values for the corresponding {device_ID, object-group_ID, object_ID} triplets. It is noted that other object attributes (not shown in FIG. 3) may include a value identifying the time of creation of the object, and a pointer or flag indicating whether the object is a parent object (e.g., a sub-directory object) or a child object (e.g., a file object).

FIG. 4 is an exemplary representation of how objects in a file directory 34 are organized in the data storage system 10 in FIG. 1. Each directory object (including the root) on an OBD may contain a section for header information and another section for entries 35. The entries 35 for the directory 34 may include a field for names (of file or sub-directory objects contained in the directory 34) and a field for corresponding identifiers. An identifier may include the values for the entire {device_ID, object-group_ID, object_ID} triplet for the corresponding object whose name appears in the "name" field. As shown in FIG. 4, some of the file objects in the directory 34 have names "a.txt," "d.bmp," "c.doc", etc. FIG. 4 also shows some exemplary values for identifiers for these names. These names and corresponding identifiers are for illustration purpose only. The directory 34 may contain many more file and sub-directory objects not shown or discussed herein.

In one embodiment, the storage manager 16 maintains a layout map for files and directories to be stored in the system 10. Every file or directory may have a unique layout map associated with it, and the layout map for a file/directory may reside on one or more OBDs 12. The layout map for a file/directory describes how that file/directory is arranged on the disks (i.e., OBDs 12). In one embodiment, the layout of an object may be selected on a file-by-file basis. A layout map may contain the following: (1) the file storage layout scheme (e.g., RAID-1, RAID-5, etc.) for files in a directory object; (2) the identities of disk(s) (OBDs) used to store the file or directory object; (3) the object identifiers used to identify the component objects (of an aggregate object) on each OBD; and (4) any other layout-specific information.

It is noted that the FSRC process can be a very time consuming process because of the need to check all objects in the system. Traditional FSRC processes, especially the dynamic checking, have been heavily I/O bound because of the need to touch multiple objects or to perform multiple "passes." On the other hand, various file system checking and recovery methods discussed hereinbelow with reference to FIGS. 5–9 attempt to perform one-pass FSRC. However, in case of orphan objects (i.e., objects without identifiable parents) or missing directory entries, it may not be feasible to attain a completely one-pass FSRC. Hence, the discussion given below assumes that the number of errors on OBDs 12 are insignificantly small and, therefore, do not affect the overall performance of the FSRC module 29. Further, the FSRC module 29 in various embodiments discussed below is configured to optimize for the common case of checking a healthy, correct file system.

FIG. 5 is an exemplary flowchart depicting steps involved in performing file system checking and recovery according to one embodiment of the present invention. As noted before, the file system recovery process may need to touch objects from random places (in a list of objects to be checked) during a dynamic check. During dynamic checking, the FSRC module 29 may need to get attributes of a file object (to verify a parent-child relationship with other object in the list of objects). Thus, in the embodiment of FIG. 5, the FSRC module 29, upon execution, obtains (from a corresponding storage manager 16) a list of objects to be checked and stores/caches the list along with relevant object-related information (e.g., object_ID's) for each object in a system memory (block 36). The system memory may be a portion of the memory on the FSRC hardware (i.e., the server/hardware platform running the FSRC module). In one embodiment, relevant object-related information may be fetched from corresponding OBDs 12 and stored in the system memory.

The object-related information that is stored for each object in the list of objects in the memory may include one or more object attributes, and a list of directory entries (for a directory object). The extent of object-related information locally stored in the memory may depend on the size of the memory allocated for file system recovery and checking. Similarly, the list of objects may contain a list of all objects in the system 10 if sufficient memory space is available. Otherwise, the list may contain a portion of all objects as discussed hereinbelow with reference to FIGS. 6–8. In one embodiment, only the object_ID of each file object is placed in the memory. Similarly, only the object_ID portion of the identifier field in directory entries may be stored in the memory for each file or sub-directory object in the directory object.

Thereafter, the FSRC module 29 performs a static and a dynamic check on each object listed on the list of objects stored in the memory (block 38). The FSRC module 29 may use corresponding object-related information (e.g., object attributes) to perform the dynamic check. As noted before, as part of a dynamic check, the FSRC module 29 attempts to verify all parent-child relationships between the current object and any other related object on the list (block 39). For example, the FSRC module 29 may read an object's attribute and compare that attribute value with values in a corresponding directory entry to verify a proper parent-child relationship. After a dynamic check on an object is over (i.e., after all parent-child relationships for that object are verified), the FSRC module 29 may "cross out" or remove that object from the list of objects and delete its object-related information from the memory (block 40). Thus, for example, after a directory object is dynamically checked, the FSRC module 29 may remove that object from the list and all of its children from the list as well. Similarly, after checking a child object, the FSRC module 29 may remove that child from the list along with its parent and all that parent's other children (after checking the parent and additional children).

Thus, in the embodiment of FIG. 5, the object list contains a list of all the objects stored on OBDs 12 in the system 10. However, if there is a restriction on the memory space available to store the list with all objects and object-related information for each object, the scheme in FIG. 5 may not be possible. For example, in case of a 5 TB (tera bytes) of disk space on OBDs 12 and all objects being small and taking up 8 KB (kilo bytes) of memory each, there may be a maximum of 600M (million) objects in the system. If only the object_ID part of an object's attribute is stored as part of that object's entry in the list of objects and if each object_ID is 8B long, then the memory required to store the list of all objects will be 8B*600M=4.8 GB (approximately). Hence, the total memory requirement for FSRC process (approximately 4.8 GB in this example) may not be available at all times or in most systems.

In one embodiment, the FSRC process has a restriction on the available memory. For example, in case of the example given immediately above, if the memory available to the FSRC process to use for an object list is 1.2GB, then the FSRC process of FIG. 5 could accommodate at most 1.2 GB/8B=150 M objects (approximately). Hence, to perform the file system recovery for all the objects in the system, the objects may be divided into segments and the FSRC process may then be performed on each segment as discussed hereinbelow with reference to embodiments of FIGS. 6–8.

Figure 6:
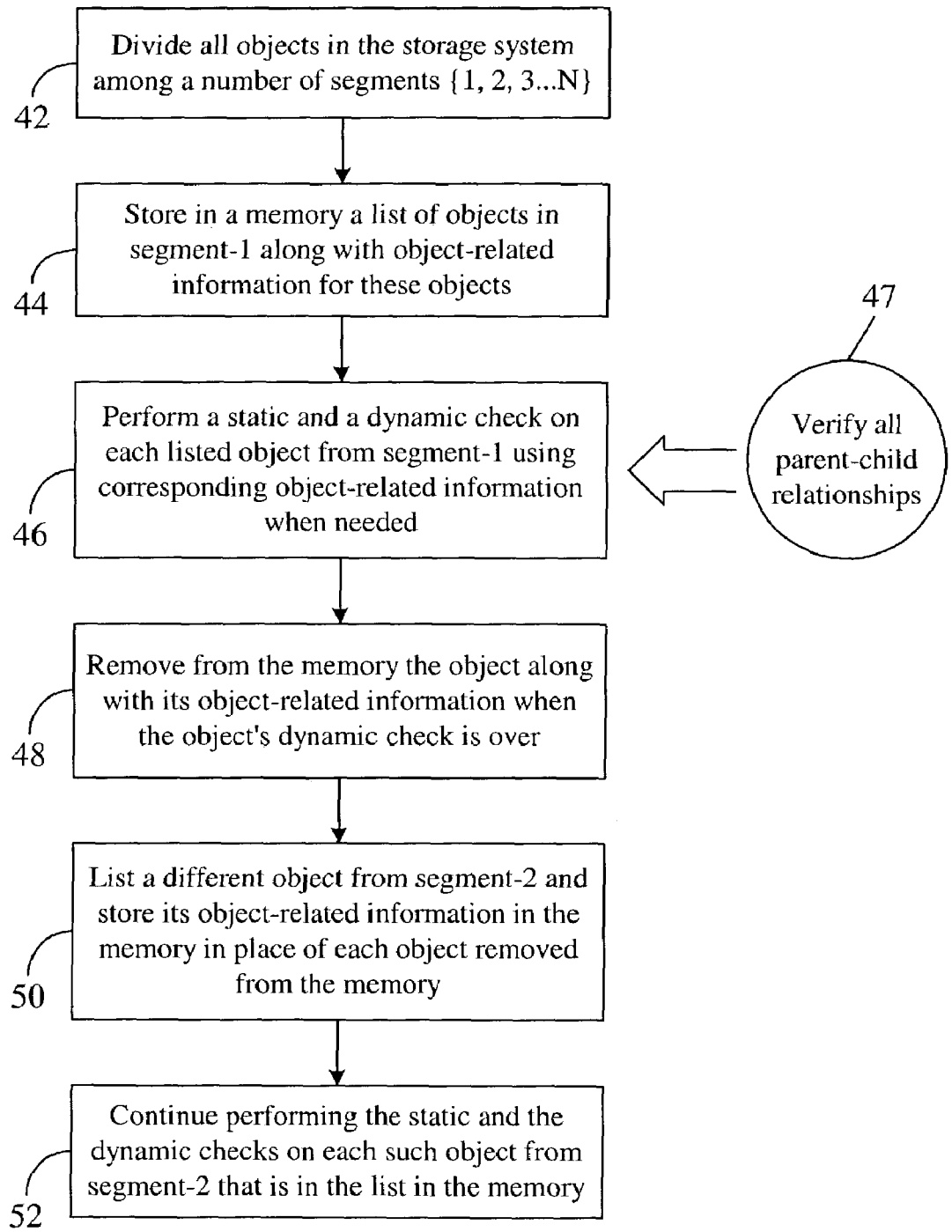
FIG. 6 shows an exemplary flowchart for a dynamic file system check according to one embodiment of the present invention.

FIG. 6 shows an exemplary flowchart for a dynamic file system check according to one embodiment of the present invention. In a system with a large number of objects and a limited memory space available for the FSRC process, the FSRC module 29 may initially divide the objects among a number of segments {1, 2, 3 . . . N} (block 42). The segments may be derived from the realm-wide global object_ID space (0 . . . n), which has a well-defined ordering of all object_ID numbers for objects in the system 10. Thus, for example, if all object_ID numbers in the system are between 20–100, then eight separate segments may be defined with first segment having objects with object_ID numbers 20–39, second segment having objects with object_ID numbers 40–49, and so on. A segment may be viewed as a virtual group of objects. This example of segmenting is for illustrative purpose only. In practice, any suitable scheme may be employed to divide system objects into segments with each segment having a non-overlapping portion of the objects in the system. Further, it is not required to have each segment covering an identical range of object_ID numbers.

The number and size of each segment can be flexibly determined depending on a number of factors discussed below.

It is noted that the segmenting described here is not to be confused with physical or logical partitioning of OBDs 12. The partitioning issue is irrelevant here. Thus, although the terms "partition" or "partitioning" occasionally appear below, they should be construed in conjunction with the concept of segmenting of the object_ID space and similar to the terms "division" or "dividing", and should not be confused with partitioning of an OBD 12. It is further noted that the objects belonging to a segment may not physically reside on the same OBD 12. Instead, the objects in a segment may actually reside on different OBDs. A segment can be viewed as a specific interval in the ordered global object_ID name space.

Division of objects among a number of segments may not be uniform. That is, each segment may not contain an identical number of objects or each object having an identical size. The total number N of segments may be heuristically determined depending on the available memory space for the FSRC process. As indicated at block 44 in FIG. 6, the FSRC module 29 stores a list of objects in one of the N segments (e.g., segment-1) along with the object-related information for all the objects in segment-1 in the memory prior to performing the dynamic check. Thus, the size of a segment may be determined by the number of objects to be assigned to that segment and the storage space required to store object-related information (e.g., object_ID's or other object attributes) for those objects. Thus, the size of each segment may differ because of the restriction on the available memory space for FSRC.

After storing the list of objects from segment-1 and corresponding object-related information for each object in the list in the memory, the FSRC module 29 performs a static and a dynamic check on each object listed on the list (i.e., each object in segment-1) and verifies all parent-child relationships for each such object as indicated at blocks 46, 47 in FIG. 6. After the dynamic check for an object (from segment-1) in the list is over, the FSRC module 29 removes or "crosses off" the object from the list and deletes that object's object-related information from the memory (block 48). Because of the similarities with operations at blocks 38–40 in FIG. 5, additional discussion for blocks 46–48 in FIG. 6 is not provided.

According to the embodiment in FIG. 6, after an object from segment-1 is removed from the list and its object-related information is deleted from the memory allotted for the FSRC process, the FSRC module 29 re-uses the freed up memory space to add to the existing list one or more objects from another segment (e.g., segment-2) and also stores their object-related information in the memory (block 50). This process is performed to replace each object whose dynamic check is over. In one embodiment, the FSRC module 29 may store new object entries in another separate list instead of storing them in the same existing list. Thereafter, the FSRC module 29 may continue performing static and dynamic checks on pre-existing and added objects in the list (block 52), until all objects in all segments are dynamically checked. This "refilling" of list with additional objects from other segments allows the FSRC module 29 to check a larger number of objects, which would not be otherwise stored in the memory initially because of the memory space restrictions. It is noted, however, that the "refilling" mechanism of FIG. 6 may degrade FSRC performance if the object space has a large number of objects (e.g., greater than 10M objects). This is because of the restrictions on the available memory for FSRC and because of the potential need for multiple touches, especially when an object in the list references an object that is not in the list. For example, if there is list of length P in the memory and an object x<P references an object y>P, then the FSRC module 29 must refetch object x (and its object-related information) later again when it performs dynamic check of object y because there may not be any other way of knowing that x references y or verifying the parent-child relationship between x and y.

Because of memory restrictions and because of a need to accommodate a large volume of objects for FSRC process, it may be desirable for FSRC module 29 to keep some information about one object referencing another object (in another segment) in the memory so as to eliminate or drastically reduce multiple passes (or touches). The entire information may not fit in the memory at one time, but may be stored on an OBD 12 in a form that can be read from an OBD 12 fairly quickly. In one embodiment, such information is stored in a link database for each corresponding segment as discussed hereinbelow with reference to FIGS. 7–10.

Figure 7:
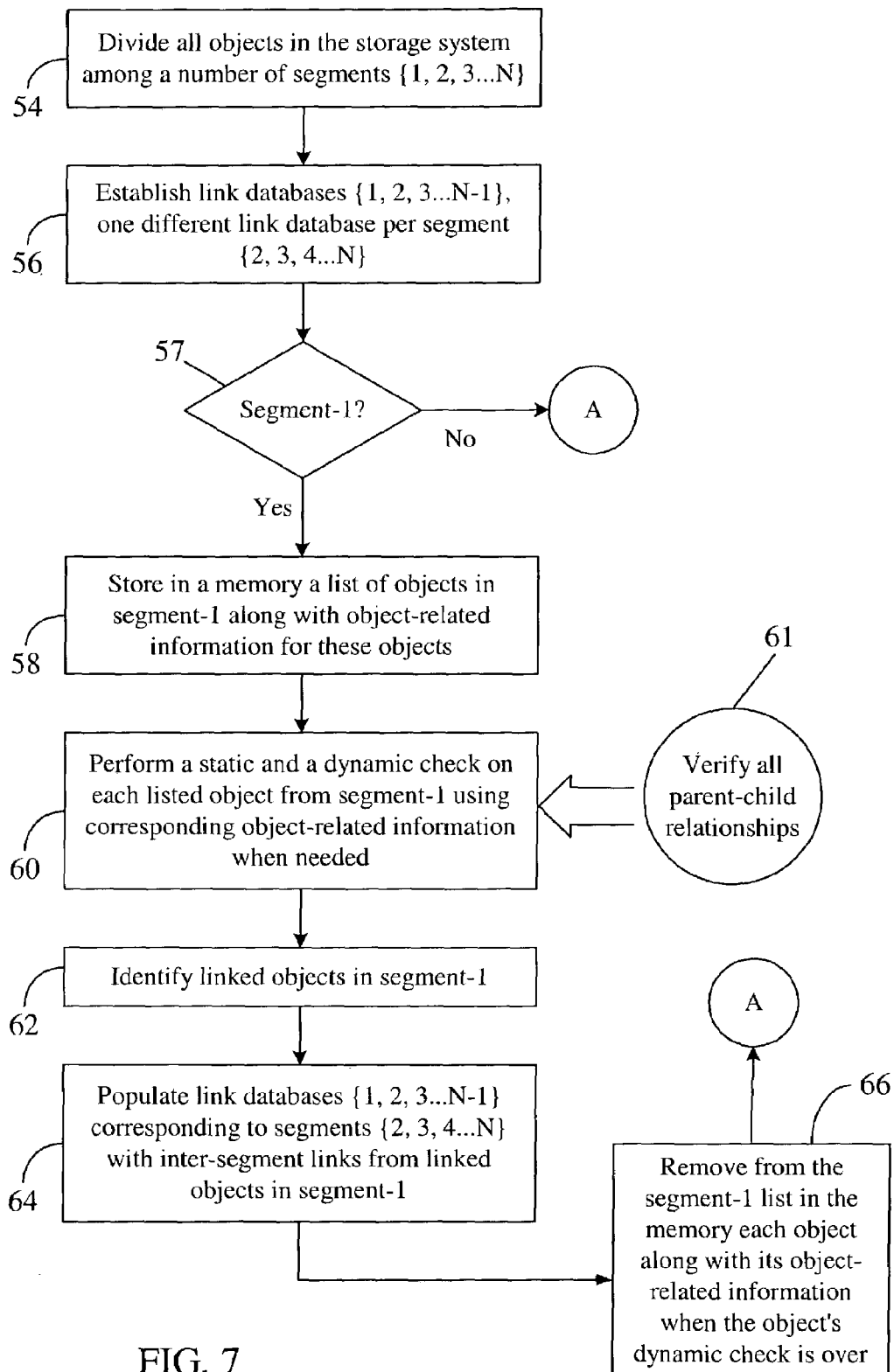
FIGS. 7–8 depict an exemplary flowchart for dynamic file system checking using link databases.
Figure 8:
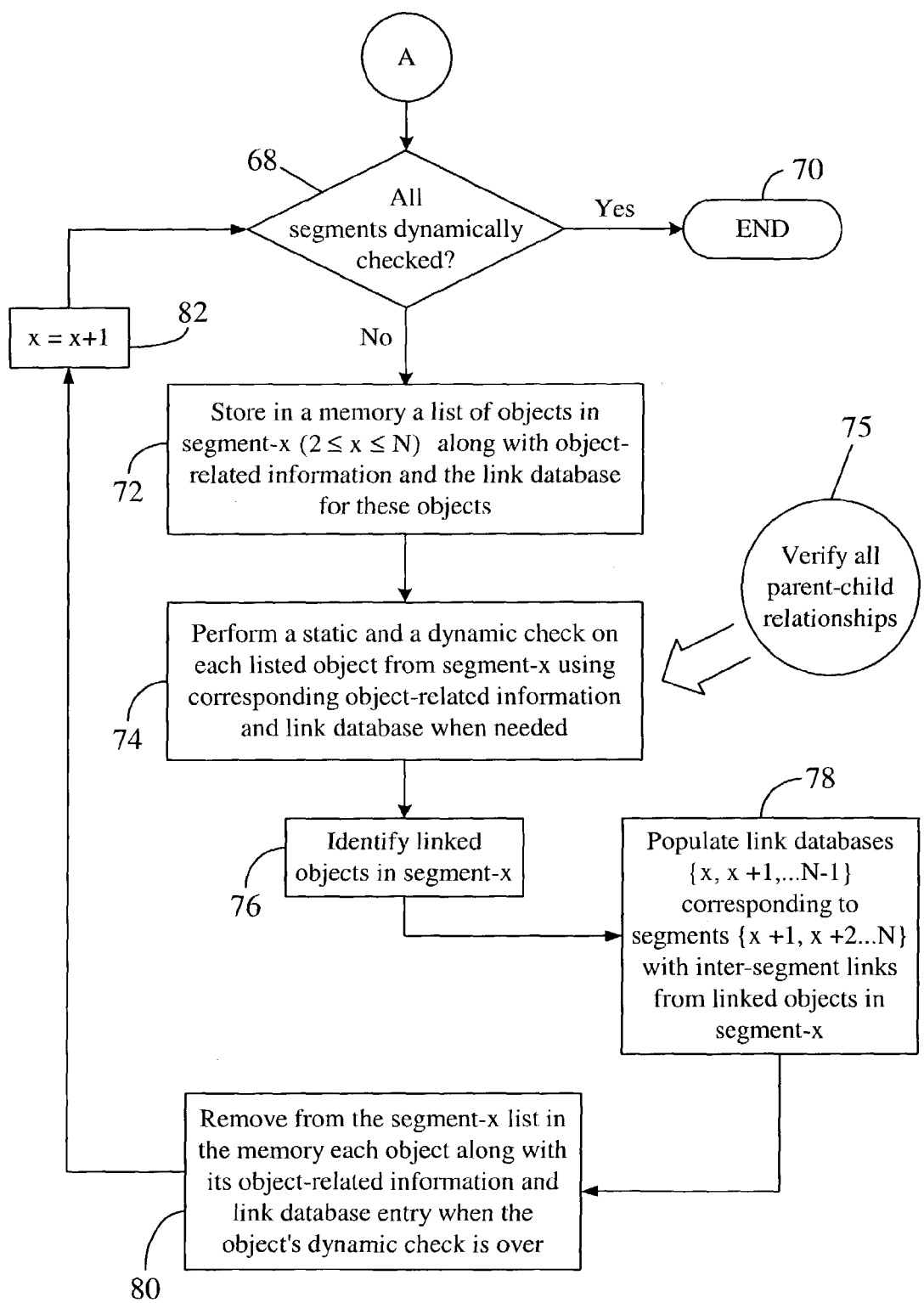

FIGS. 7–8 depict an exemplary flowchart for dynamic file system checking using link databases. An exemplary set of fields for a link database is shown and discussed hereinbelow with reference to FIG. 10. As described in more detail later, link databases keep information that describe forward and backward pointers among objects in various segments in such a way that if one had an object and the information about the "link" or pointer to another object, it would be possible to determine if that link needs to be repaired or not. Prior to discussing the flowchart in FIGS. 7–8 in more detail, it is noted that very little discussion is provided for the blocks 54, 58–61, 66, and 72–75 because of the similarity of operations described by those blocks and the operations discussed earlier with reference to blocks 42–48 in FIG. 6. Initially, after dividing all objects into N segments {1, 2, 3 . . . N} (block 54), the FSRC module 29 may establish N–1 link databases {1, 2, 3 . . . N–1 } (block 56). There is one link database per segment except that the first segment (e.g., segment-1) that is being selected to initiate system-wide dynamic checking may not have a link database associated with it. Thus, each of the segments 2 through N may have one link database associated with it. For example, segment-2 has link database-1 associated with it, segment-3 has link database-2 associated with it, and so on. As discussed below, each link database preferably stores information about inter-segment links. However, in an alternative embodiment, there may be one link database for segment-1. In that event, the link database for segment-1 would store information on intra-segment links, i.e., links within segment-1. As this case is relatively straightforward, the embodiment in FIGS. 7–10 focuses on link databases related to inter-segment linking.

At the start of the FSRC process, all link databases are empty. The link databases may be created and stored on one or more OBDs 12. In that event, the relevant link database (i.e., the link database associated with the current segment being dynamically checked) may be loaded into the memory (allotted for FSRC process) from the OBD 12 storing it. Any writes into a link database (e.g., to populate the link database as discussed later) may be performed by accessing the OBD 12 storing the database and performing the requisite write operation. The FSRC process starts when the FSRC module 29 selects one of the segments (e.g., segment-1) for dynamic checking (block 57). As with the embodiments in FIGS. 5 and 6, the FSRC module 29 stores in the memory a list of objects in segment-1 along with relevant object-related information for those objects and commences performing a static and a dynamic check on each object listed on the list (blocks 58–61). If there were only one segment in the file system 10 (e.g., if segment-1 were the only segment present in the file system 10), then the FSRC module 29 can perform dynamic checking on the objects in that segment by touching the objects only once because all the "links" (i.e., forward or backward pointers) will be pointing to the same live object group (i.e., the group of objects in segment-1) as there is only one segment. In such a situation, a link database for segment-1, if there were any, would contain links internal to segment-1 and these links could be easily checked because the object list and relevant object-related information for objects in segment-1 are already in the memory allotted for FSRC. Hence, in the discussion below, such intra-segment links are not discussed. Further, the link databases discussed below are concerned with inter-segment (i.e., across segments) links only as opposed to intra-segment links within a particular segment.

In case of more than one segment in the system (as, for example, in the embodiment of FIGS. 7–10), there may be one or more objects in segment-1 that reference (either as a parent or as a child) one or more objects in one or more other segments. These objects referencing other objects (in other segments) through inter-segment links are referred to hereinbelow as "linked objects." During dynamic checking of objects in segment-1, the FSRC module 29 identifies each linked object in segment-1 (block 62). After identifying a linked object, the FSRC module 29 stores link-related information (i.e., populates a link database) in all link databases corresponding to those segments referenced by the linked object in segment-1 (block 64). Thus, a link database for segment-X (for example) keeps links from segments Y (Y≠X) such that the destination object of a link (in the link database for segment-X) is an object in segment-X. It is noted that the term "destination" does not necessarily mean that the child object is in segment-X. If a child in segment-Y has a parent in segment-X, then the parent is the destination. Thus, if a link is across segments, the FSRC module 29 may have two options: (1) repair/check the link by touching the object on the other end of the link (i.e., in a segment other than the current segment that is being dynamically checked) and face the performance penalty of doing the reverse when that segment (containing the object on the other end of the link) is checked, or (2) maintain some information (e.g., a link database) about the link so that when the destination segment of the link is checked there may be no need to do the reverse check (thereby, avoiding multiple passes) if the information about that specific link was correct. The flowchart in FIGS. 7–8 depict one implementation of the second option give above.

Figure 9:
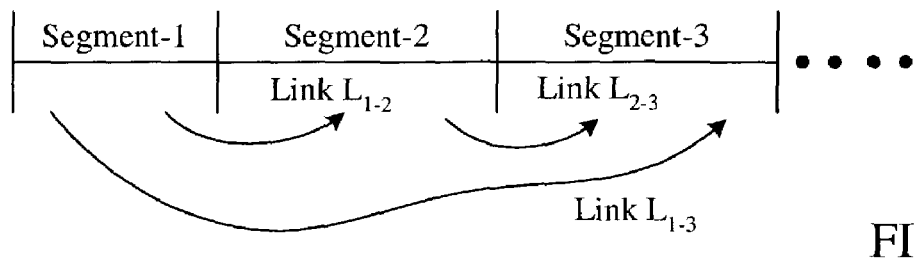
FIG. 9 illustrates some exemplary links among three segments of object_ID space in the file system in FIG. 1.

FIG. 9 illustrates some exemplary links among three segments of object_ID space in the file system in FIG. 1. In the example illustrated in FIG. 9, there are three segments: segment-1, segment-2, and segment-3. It is assumed that segment-1 has a parent directory P and its child A, segment-2 has P's child B, and segment-3 has B's child C. It is also assumed that the FSRC module 29 commences dynamic checking of all segments starting with segment-1. Hence, when the FSRC module 29 reads object P in segment-1, it finds that P has three children A, B and C. A is in the same segment as P and, hence, is checked immediately by loading A's attributes (from the memory for FSRC), checking that forward and backward pointers (or intra-segment "links") and other attributes between parent P and child A match and then crossing off or removing A from the list of objects in segment-1. As B is in segment-2, the FSRC module 29 will create an entry in segment-2's link database (link $L_{1-2}$ in FIG. 9) that describes a link between P and B, where B is the destination object. An exemplary set of fields for a link database is discussed hereinbelow with reference to FIG. 10. As noted before, the FSRC module 29 may access the OBD 12 storing the link database for segment-2 and write into it the entry for the link $L_{1-2}$. It is noted that because data writing into an OBD is fast, in one embodiment, the FSRC module 29 may "batch" the writing operation. In other words, the FSRC module 29 may accumulate pending write operations and perform more than one write operation in a single access to the OBD storing segment-2's link database.

As C, a child of parent P, is in segment-3, the FSRC module 29 will also access the OBD 12 storing the link database for segment-3 and write into it an entry (i.e., link $L_{1-3}$ in FIG. 9) that describes a link between parent P and its remote child C, where C is the destination object of link $L_{1-3}$. After checking for all children of P, the FSRC module 29 may cross off P from the object list for segment-1 (block 66, FIG. 7). Thus, the processes of identifying linked objects, populating appropriate link databases, and crossing off objects upon completion of dynamic checking are performed for all objects in segment-1 prior to moving on to the next segment (e.g., segment-2) as indicated at blocks 62–66 in FIG. 7.

After dynamically checking all objects in segment-1, the FSRC module 29 checks whether all segments are dynamically checked (block 68) and then terminates the FSRC process if so (block 70). Otherwise, the FSRC module 29 continues performing dynamic checking of remaining segments-one segment at a time. The order of selecting segments for dynamic checking may be predefined (e.g., segment-m precedes segment-n if m<n) or may be determined at run time. The flowchart in FIG. 8 illustrates the process of dynamic checking of all remaining segments X, where X=2, 3, 4 . . . N. For example, in the event that segment-2 is taken up for dynamic checking after segment-1, the FSRC module 29 stores a list of objects in segment-2 along with relevant object-related information in the memory for FSRC. Additionally, the FSRC module 29 also stores the link database for segment-2 in the memory. This link database is then used to verify all parent-child relationships between a linked object from segment-2 and other objects in prior segments (here, segment-1 only) (blocks 72–75, FIG. 8). In the above example of objects P, A, B and C, when the FSRC module 29 dynamically checks object B in segment-2 (at blocks 74–75 in FIG. 8), it looks at all entries in segment-2's link database that have object B as destination and tries to match up that information with information stored in the attributes for object B to identify who is B's parent and also to verify whether P is the true parent for B. Furthermore, as noted above, the FSRC module 29 also identifies whether the current object is a linked object (block 76). As object B is a linked object, the FSRC module 29 populates the link database for segment-3 to describe a link (i.e., link $L_{2-3}$ in FIG. 9) between objects B and C, where C is the destination object (blocks 76, 78 in FIG. 8). Upon verification that all parent-child relationships for object B is correct and after placing entries in appropriate link databases, the FSRC module 29 removes object B from the list of objects in the memory and also deletes B's object-related information in the memory (block 80). In one embodiment, after completion of dynamic checking of an object, the FSRC module 29 also removes all entries related to that object (e.g., object B) from the current segment's (e.g., segment-2's) link database as indicated at block 80 in FIG. 8. The process identified by blocks 74–80 in FIG. 8 is repeated by the FSRC module 29 for all objects on the list of objects for a segment prior to moving to the next segment (block 82) for dynamic checking.

When the FSRC module reaches object C in segment-3, it does not need to touch objects P and B in segments 1 and 2 respectively because the relevant links are already there in segment-3's link database. Thus, object C is immediately checked once all relationships (between P and C, and B and C) are verified from the links $L_{1-3}$ and $L_{2-3}$ in segment-3's link database. Thus, the process of writing into link databases and later checking the written entries for verification of appropriate parent-child relationships propagates across all segments until all objects in all segments are dynamically checked as illustrated by the process loop (at block 82) in FIG. 8. Once all objects in all segments are dynamically checked, the FSRC process terminates (block 70, FIG. 8).

Figure 10:
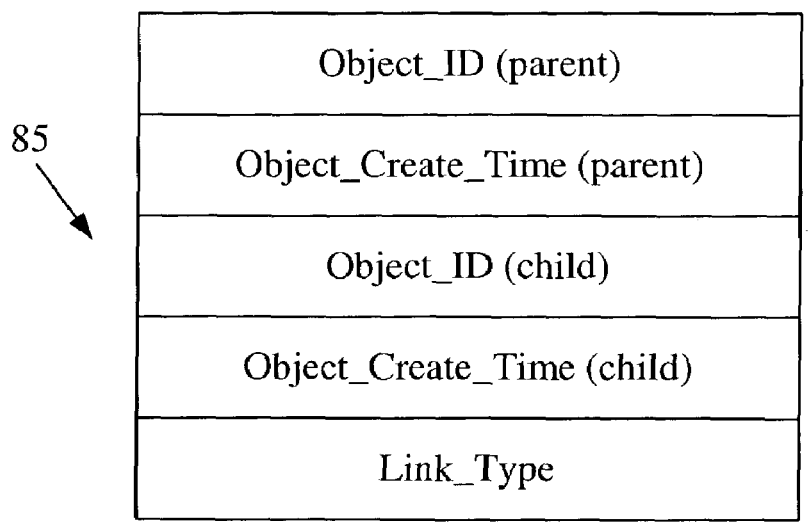
FIG. 10 shows a table illustrating some exemplary link database fields.

FIG. 10 shows a table 85 illustrating some exemplary link database fields. In the embodiment in FIG. 10, each entry in the link database has five fields associated therewith. The fields are: (1) object_ID (parent) that identifies the object_ID value of the parent of the destination object (if the destination object is a child) or the destination object itself (if the destination object is the parent), (2) object_create time (parent) that indicates the time of creation of the parent object identified by the object_ID (parent) field, (3) object_ID (child) that identifies the object_ID value of the child of the destination object (if the destination object is a parent) or the destination object itself (if the destination object is the child), (4) object_create_time (child) that indicates the time of creation of the child object identified by the object_ID (child) field, and (5) link_type that identifies the type of the link (a forward or a backward pointer) that links the destination object to the other linked objects in segments that were checked prior to the segment containing the destination object. Thus, for example, the link_type field may describe whether the current entry (in the link database) describes a link from a normal directory object to a normal child object or a link from a file object to a directory object. It is noted that the direction of a link is important here to correctly identify and verify the relationship between two objects on either ends of the link.

As an example, in the embodiment illustrated in FIG. 9, object B in segment-2 may have the following link database entry: object_ID (parent) would identify object P in segment-1, object_create_time (parent) would be time of creation of object P, object_ID (child) would identify object B in segment-1 (because B is a child of P), and link_type would refer to a forward pointer from P to B (which would match with a backward pointer from B to P when B's attributes are checked during FSRC). It is noted that there may be more than one entry for a destination object in a link database as, for example, the link database entries for object C in segment-3 in the embodiment of FIG. 9. In one embodiment, the memory space requirement for the values contained in all fields for an entry in a link database is small (for example, about 35 bytes).

It is noted that when the FSRC module 29 performs a dynamic check on two linked objects A and B (one of them must live in the segment that is currently being processed), the following four situations may occur: (1) If objects A and B are in the same segment, then the FSRC module 29 can immediately check them and perform necessary repair (e.g., correcting an attribute value) in case of an error (e.g., relationship between the objects being misreported) during dynamic checking. (2) If A is in another segment (thus, B must be in the current segment), and if there is an entry in the current segment's link database correctly representing the relationship between A and B, then the dynamic check of both A and B is complete. However, if the entry is there, but the relationship is wrong, then the FSRC module 29 may need to fetch object A's attributes (by accessing appropriate OBD or by contacting appropriate storage manager if needed) and perform necessary repair. After the repair or check is done, the entry (for object B) may be removed from the current segment's link database. (3) If A is in another segment that was previously processed and there is no entry in the current segment's (i.e., the segment containing B) link database that shows a relationship between A and B in any way, then FSRC module 29 may need to fetch A's attributes (by accessing appropriate OBD or by contacting appropriate storage manager if needed) and perform necessary repair. (4) If A is in another segment that has not been processed yet, the FSRC module 29 may add an entry in the link database for segment containing A as discussed hereinbefore with reference to FIGS. 7–10.

As noted before, FSRC module 29 proceeds by checking and repairing all objects in a segment—one segment at a time—until all objects in all segments have been checked. In one embodiment, the FSRC module 29 may only check all live objects (as opposed to snapshot or image objects) in the system 10. In one embodiment, after all the objects have been checked in a segment and if there are any entries still left in the current segment's link database, the FSRC module 29 may fetch and repair the objects linked by these "orphaned" entries. Further, it is preferable to keep the size of a link database small enough to fit the entire link database in the memory allotted for the FSRC process. It is noted that only one link database needs to be kept in the memory even though the FSRC module 29 may potentially make many writes to many other link databases. In one embodiment, it may be preferable to have each file object in the same segment as that for its parent so as to minimize link database space in the memory for FSRC or to accommodate the entire link database for a segment in the memory. However, in some situations, it may not be possible to store the entire link database for a segment in the memory as, for example, when there are a large number (e.g., 5 million) of directories in one segment and all the other segments contain files that point back to the directories in the first segment.

Further, if there is a fixed (or predetermined) number of objects that may reside in a segment (e.g., 2 million objects per segment), then a directory having more than the fixed number of objects (e.g., a directory with 5 million objects) may have to be spread over several segments. Thus, to minimize memory space occupied by a link database for a segment, it may be preferable to select objects in the segment in such a way as to minimize cross-segment or inter-segment links from that segment to other segments in the system. In case the FSRC module 29 is not able to load the entire link database for a segment in the FSRC memory, the FSRC module 29 may proceed by loading as much portion of the link database as possible in the memory and commence performing the normal FSRC run over all objects in the segment. The FSRC module 29 may then deal with the "leftover" links (i.e., the links that couldn't initially get stored in the memory) in the same manner as dealing with orphaned entries (discussed hereinbefore) in a link database in the normal case. In other words, the FSRC module 29 would continue checking and repairing link endpoints for all leftover links. However, such breaking-up of a link database into different portions may result in heavy performance penalty (e.g., increased I/O communication load).

In one embodiment, the FSRC module 29 may simultaneously perform the FSRC process on more than one segment. In the parallel FSRC process according to this embodiment, there may be three disjoint sets of segments: (1) a set of P (Past) segments that have already been checked, (2) a set of N (Now) segments that are currently being checked, and (3) a set of F (Future) segments that have not been checked yet. In this embodiment, each of the N FSRC processes running in parallel may need to know the contents of P, N, and F segments at all times. In one embodiment, a Part-Time Parliament (PTP) model may be used by the FSRC module 29 to synchronize states among the N current processes so that each process may have an identical view of the file system. A more detailed discussion of the PTP model referred to herein is provided in "The Part-Time Parliament" by Leslie Lamport, Digital Equipment Corporation, Sep. 1, 1989, which is incorporated herein by reference in its entirety. Generally, each of the N processes may be executed in the manner that is similar to that described with reference to FIGS. 7–10 in case of just one process at a time. In the event that there is a link in to an object M in a segment $I_Y$ in the set N, there may be two ways to treat such a situation: (1) Ignore the link: Here, the link at issue may be treated as a broken link. This may cause the object M (associated with the so-called broken link) to be fetched several times. However, if N is reasonably small, the probability of this happening may be negligible. (2) Treat the link in the set N the same was as a link in the set F: Here, when processing an object O in segment $I_X$ in set N that has a link to the object M in the segment $I_Y$ in the set N, record the O-M link in the link database $D_Y$ for segment $I_Y$. Then, a scrubber/fixer software may be invoked to run over all the entries in $D_Y$, after segment $I_Y$ moves to the set P. It may be possible for the scrubber application to get 100% cache hits during run time.

It is noted that various managers (e.g., file managers 14, storage managers 16, etc.) shown and described with reference to FIG. 1, the program code implemented to operate the system 10 in FIG. 1, and the program code for the FSRC module 29 may reside on a computer-readable, tangible storage medium (e.g., a compact disc, an optical disc, a magnetic storage medium such as a computer hard drive, etc.) allowing ease of software portability and system management. The program code on the storage medium can be executed by a computer system processor and upon execution, the program code may cause the processor to perform various operations described hereinabove with reference to individual components (e.g., managers, FSRC module) constituting the program code. Similarly, a client application (e.g., any of the client applications 24, 26 in FIG. 1) can also be stored on a computer-readable data storage medium and executed therefrom.

The foregoing describes a file system recovery (FSRC) process in a distributed, object-based data storage system. An FSRC module performs dynamic checks on file system objects to verify that parent-child relationships among various objects in the system are correct. In one embodiment, to minimize touching of objects more than once during an FSRC check, the FSRC module may store a list of objects in the system along with relevant object-related information for each object on the list in a memory. A dynamic check on each listed object is then performed using the object-related information to verify parent-child relationships for that object. After the dynamic check is over, the object is removed from the list and its object-related information is deleted from the memory. In another embodiment, objects in the system are divided into a number of segments and a dynamic check is performed on objects in one segment. After a dynamic check is over for an object in the current segment, that object's entry on the list in the memory is replaced with an entry for another object from another segment. The new object's object-related information is also stored in the memory replacing the object-related information of the old object. In a still further embodiment, a link database is created for one or more segments in the system. A link database for segment X keeps links (forward or backward pointers) from segments Y (Y≠X) such that the destination object of each link is in segment X. During dynamic checking of objects in segment X, the link database for segment X is also loaded in the FSRC memory and is consulted to verify parent-child relationships between an object in segment X that is linked to another object in another segment. Thus, with a link database for a segment, multiple passes to objects in the system are avoided during file system recovery.

While the invention has been described in detail and with reference to specific embodiments thereof, it will be apparent to one skilled in the art that various changes and modifications can be made therein without departing from the spirit and scope thereof. Thus, it is intended that the present invention cover the modifications and variations of this invention provided they come within the scope of the appended claims and their equivalents.

The invention claimed is:

1. A method of performing file system recovery in an object-based data storage system that includes one or more object-based devices that store data files, comprising:
    storing a list of objects representing at least attributes of the data files that are stored in said data storage system in a memory in said data storage system;
    performing a dynamic check on each object in said list as part of said file system recovery, wherein said dynamic check includes using at least said attributes to verify all parent-child relationships between two or more objects contained in said list; and
    removing from said list in said memory each such object whose corresponding dynamic check has been completed, and deleting from said memory corresponding object-related information for each object removed from said list without affecting the data files stored in the data storage system;
    wherein storing said list includes storing in said memory corresponding object-related information for each object listed in said list, and performing said dynamic check includes verifying that a forward pointer in said corresponding object-related information for a parent object in said list linking said parent object to a child object in said list has a matching backward pointer in said corresponding object-related information for said child object, and vice versa.

2. The method of claim 1, wherein said object-related information includes at least one of the following attributes of a respective object:
    a first attribute identifying an entity in said data storage system responsible for storing said respective object;
    a second attribute identifying an object group containing said respective object;
    and
    a third attribute identifying said respective object.

3. A computer-readable storage medium containing a program code, which, upon execution by a processor in an object-based distributed data storage system that includes one or more object-based devices that store data files, causes said processor to perform the following as part of file system recovery in said object-based data storage system:

store a list of objects representing at least attributes of the data files that are stored in said data storage system in a memory in said data storage system;

perform a dynamic check on each object in said list, wherein said dynamic check includes using at least said attributes to verify all parent-child relationships between two or more objects contained in said list; and remove from said list in said memory each such object whose corresponding dynamic check has been completed, and delete from said memory corresponding object-related information for each object removed from said list without affecting the data files stored in the data storage system;

wherein said list stored in said memory includes corresponding object-related information for each object listed in said list, and said dynamic check includes verifying that a forward pointer in said corresponding object-related information for a parent object in said list linking said parent object to a child object in said list has a matching backward pointer in said corresponding object-related information for said child object, and vice versa.

4. An object-based data storage system that includes one or more object-based devices that store data files, comprising:

means for storing a list of objects representing at least attributes of the data files that are stored in said data storage system in a memory in said data storage system;

means for performing a dynamic check on each object in said list as part of file system recovery in said object-based data storage system, wherein said dynamic check includes using at least said attributes to verify all parent-child relationships between two or more objects contained in said list; and means for removing from said list in said memory each such object whose corresponding dynamic check has been completed and deleting from said memory corresponding object-related information for each object removed from said list without affecting the data files stored in the data storage system;

wherein said means for storing said list includes means for storing in said memory corresponding object-related information for each object listed in said list, and said means for performing said dynamic check includes means for verifying that a forward pointer in said corresponding object-related information for a parent object in said list linking said parent object to a child object in said list has a matching backward pointer in said corresponding object-related information for said child object, and vice versa.

5. A method of performing file system recovery in an object-based data storage system that includes one or more object-based devices that store data files, comprising:

dividing all objects stored in said data storage system among a plurality of segments with each of said plurality of segments containing a non-overlapping portion of said stored objects;

storing an object list representing at least attributes of the data files and containing a list of all objects in a first segment in said plurality of segments in a memory in said data storage system;

performing a dynamic check on each object in said object list as part of said file system recovery, wherein said dynamic check includes using at least said attributes to verify all parent-child relationships between two or more objects contained in said first segment and also between a first object in said first segment and a second object in a second segment in said plurality of segments;

removing from said object list in said memory each such object whose corresponding dynamic check has been completed, and deleting from said memory corresponding object-related information for each object removed from said list without affecting the data files stored in the data storage system;

listing a corresponding different object from a third segment in said plurality of segments in place of each object removed from said object list; and further performing said dynamic check on each object from said third segment that is listed in said object list;

wherein storing said object list includes storing in said memory a corresponding object-related information for each object listed in said object list, and wherein performing said dynamic check includes verifying one of the following:

that a first forward pointer in said corresponding object-related information for a first parent object in said first segment linking said first parent object to a first child object in said second segment has a matching first backward pointer in said corresponding object-related information for said first child object; and that a second backward pointer in said corresponding object-related information for a second child object in said first segment linking said second child object to a second parent object in said second segment has a matching second forward pointer in said corresponding object-related information for said second parent object.

6. The method of claim 5, wherein said object-related information includes at least one of the following attributes of a respective object:

a first attribute identifying an entity in said data storage system responsible for storing said respective object;

a second attribute identifying an object group containing said respective object; and a third attribute identifying said respective object.

7. A method of performing file system recovery in an object-based data storage system that includes one or more object-based devices that store data files, comprising:

dividing all objects stored in said data storage system among a plurality of segments with each of said plurality of segments containing a non-overlapping portion of said stored objects;

establishing a plurality of link databases, wherein each link database in said plurality of link databases corresponds to a different one of said plurality of segments;

performing a first dynamic check on each object in a first segment in said plurality of segments as part of said file system recovery, wherein said first dynamic check includes verification of all parent-child relationships between two or more objects contained in said first segment and also between one object in said first segment and another object in a second segment in said plurality of segments;

identifying one or more linked objects in said first segment, wherein each linked object in said first segment has a parent-child relationship with one or more other objects in one or more other segments in said plurality of segments; and populating a first link database corresponding to said second segment with a respective entry for each linked object in said first segment that has a corresponding destination object in said second segment, wherein each said destination object in said second segment has said parent-child relationship with a respective linked object in said first segment, and wherein each said entry in said first link database contains information describing how each said destination object in said second segment is linked to said respective linked object in said first segment via a forward or a backward link;

further comprising storing a list of objects in said first segment and corresponding object-related information representing at least attributes of at least one of the data files for each object in said list in a memory in said data storage system prior to performing said first dynamic check;

wherein performing said first dynamic check includes using at least said attributes to verify one of the following:

that a first forward pointer in said corresponding object-related information for a first parent object in said first segment linking said first parent object to a first child object in said second segment has a matching first backward pointer in said corresponding object-related information for said first child object; and that a second backward pointer in said corresponding object-related information for a second child object in said first segment linking said second child object to a second parent object in said second segment has a matching second forward pointer in said corresponding object-related information for said second parent object; and removing from said list in said memory each such object whose corresponding dynamic check has been completed and deleting from said memory corresponding object-related information for each object removed from said list without affecting the data files stored in the data storage system.

8. The method of claim 7, wherein said object-related information includes at least one of the following attributes of a respective object:

a first attribute identifying an entity in said data storage system responsible for storing said respective object;

a second attribute identifying an object group containing said respective object; and a third attribute identifying said respective object.

9. The method of claim 7, further comprising:

storing a list of objects in said second segment and a corresponding object-related information for each object in said list in a memory in said data storage system;

further storing at least a portion of said first link database corresponding to said second segment in said memory; and performing a second dynamic check on each object in said list of objects using said corresponding object-related information therefor, wherein said second dynamic check includes verification of all parent-child relationships between two or more objects contained in said second segment and also between one object in said second segment and another object in said first segment.

10. The method of claim 9, wherein performing said second dynamic check includes performing said second dynamic check on each object in said list using said corresponding object-related information therefor and using, when needed, each said respective entry stored in said portion of said first link database, and wherein the method further comprises:

removing from said list in said memory each such object whose corresponding second dynamic check has been completed;

deleting from said memory said corresponding object-related information for each object removed from said list; and removing from said portion of said first link database each said respective entry that corresponds to said object removed from said list.

11. The method of claim 9, wherein said object-related information includes at least one of the following attributes of a respective object:

a first attribute identifying an entity in said data storage system responsible for storing said respective object;

a second attribute identifying an object group containing said respective object;

and a third attribute identifying said respective object.

12. The method of claim 9, wherein performing said second dynamic check includes verifying one of the following:

that a first forward pointer in said corresponding object-related information for a first parent object in said second segment linking said first parent object to a first child object in said first segment has a matching first backward pointer in said corresponding object-related information for said first child object; and that a second backward pointer in said corresponding object-related information for a second child object in said second segment linking said second child object to a second parent object in said first segment has a matching second forward pointer in said corresponding object-related information for said second parent object.

13. The method of claim 9, further comprising:

identifying one or more linked objects in said second segment, wherein each linked object in said second segment has a parent-child relationship with one or more other objects in one or more other segments in said plurality of segments; and populating a second link database corresponding to a third segment in said plurality of segments with a respective entry for each linked object in said second segment that has a corresponding destination object in said third segment, wherein each said destination object in said third segment has said parent-child relationship with a respective linked object in said second segment, and wherein each said entry in said second link database contains information describing how each said destination object in said third segment is linked to said respective linked object in said second segment via a forward or a backward link.

14. A computer-readable storage medium containing a program code, which, upon execution by a processor in an object-based distributed data storage system that includes one or more object-based devices that store data files, causes said processor to perform the following:

divide all objects stored in said data storage system among a plurality of segments with each of said plurality of segments containing a non-overlapping portion of said stored objects;

establish a plurality of link databases, wherein each link database in said plurality of link databases corresponds to a different one of said plurality of segments;

perform a dynamic check on each object in a first segment in said plurality of segments as part of file system recovery, wherein said dynamic check includes verification of all parent-child relationships between two or more objects contained in said first segment and also between one object in said first segment and another object in a second segment in said plurality of segments;

identify one or more linked objects in said first segment, wherein each linked object in said first segment has a parent-child relationship with one or more other objects in one or more other segments in said plurality of segments; and populate a link database corresponding to said second segment with a respective entry for each linked object in said first segment that has a corresponding destination object in said second segment, wherein each said destination object in said second segment has said parent-child relationship with a respective linked object in said first segment, and wherein each said entry in said link database contains information describing how each said destination object in said second segment is linked to said respective linked object in said first segment via a forward or a backward link;

store a list of objects in said first segment and a corresponding object-related information representing at least attributes of at least one of the data files for each object in said list in a memory in said data storage system prior to performing said first dynamic check;

wherein said dynamic check includes using at least said attributes to verify one of the following:

that a first forward pointer in said corresponding object-related information for a first parent object in said first segment linking said first parent object to a first child object in said second segment has a matching first backward pointer in said corresponding object-related information for said first child object; and that a second backward pointer in said corresponding object-related information for a second child object in said first segment linking said second child object to a second parent object in said second segment has a matching second forward pointer in said corresponding object-related information for said second parent object; and remove from said list in said memory each such object whose corresponding dynamic check has been completed and delete from said memory corresponding object-related information for each object removed from said list without affecting the data files stored in the data storage system.

15. An object-based data storage system that includes one or more object-based devices that store data files, comprising:

means for dividing all objects stored in said data storage system among a plurality of segments with each of said plurality of segments containing a non-overlapping portion of said stored objects;

means for establishing a plurality of link databases, wherein each link database in said plurality of link databases corresponds to a different one of said plurality of segments;

means for performing a dynamic check on each object in a first segment in said plurality of segments, wherein said dynamic check includes verification of all parent-child relationships between two or more objects contained in said first segment and also between one object in said first segment and another object in a second segment in said plurality of segments;

means for identifying one or more linked objects in said first segment, wherein each linked object in said first segment has a parent-child relationship with one or more other objects in one or more other segments in said plurality of segments; and means for populating a link database corresponding to said second segment with a respective entry for each linked object in said first segment that has a corresponding destination object in said second segment, wherein each said destination object in said second segment has said parent-child relationship with a respective linked object in said first segment, and wherein each said entry in said link database contains information describing how each said destination object in said second segment is linked to said respective linked object in said first segment via a forward or a backward link;

means for storing a list of objects in said first segment and a corresponding object-related information representing at least attributes of at least one of the data files for each object in said list in a memory in said data storage system prior to performing said first dynamic check;

wherein said dynamic check includes using at least said attributes to verify one of the following:

that a first forward pointer in said corresponding object-related information for a first parent object in said first segment linking said first parent object to a first child object in said second segment has a matching first backward pointer in said corresponding object-related information for said first child object; and that a second backward pointer in said corresponding object-related information for a second child object in said first segment linking said second child object to a second parent object in said second segment has a matching second forward pointer in said corresponding object-related information for said second parent object; and means for removing from said list in said memory each such object whose corresponding dynamic check has been completed and deleting from said memory corresponding object-related information for each object removed from said list without affecting the data files stored in the data storage system.

* * * * *